United States Patent
Tang et al.

(10) Patent No.: US 7,131,108 B1
(45) Date of Patent: Oct. 31, 2006

(54) SOFTWARE DEVELOPMENT SYSTEM HAVING PARTICULAR ADAPTABILITY TO FINANCIAL PAYMENT SWITCHES

(75) Inventors: Antony Shui Sum Tang, Doncaster (AU); Alice Fung Ching Yip, Doncaster (AU); Isana Vaiioc Lei, Sai Ying Pun (HK)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/550,192

(22) Filed: Apr. 17, 2000

(51) Int. Cl.
*G06F 9/44* (2006.01)
*G06F 3/00* (2006.01)
*G06Q 40/00* (2006.01)

(52) U.S. Cl. ............... 717/107; 705/39; 705/79; 719/313

(58) Field of Classification Search .......... 705/39, 705/40, 79, 44, 45; 717/107, 108, 174; 719/313
See application file for complete search history.

(56) References Cited

U.S. PATENT DOCUMENTS

| | | | | |
|---|---|---|---|---|
| 5,621,796 A | * | 4/1997 | Davis et al. | 705/68 |
| 5,757,917 A | * | 5/1998 | Rose et al. | 705/79 |
| 5,949,880 A | * | 9/1999 | Curry et al. | 380/23 |
| 6,061,665 A | * | 5/2000 | Bahreman | 705/40 |
| 6,072,870 A | * | 6/2000 | Nguyen et al. | 380/4 |
| 6,119,105 A | * | 9/2000 | Williams | 705/39 |
| 6,128,602 A | * | 10/2000 | Northington et al. | 705/35 |
| 6,253,027 B1 | * | 6/2001 | Weber et al. | 380/4 |
| 6,317,729 B1 | * | 11/2001 | Camp et al. | 705/79 |
| 6,330,586 B1 | * | 12/2001 | Yates et al. | 709/201 |
| 6,366,893 B1 | * | 4/2002 | Hannula et al. | 705/40 |
| 2001/0016834 A1 | * | 8/2001 | Yamanaka et al. | 705/40 |
| 2001/0032182 A1 | * | 10/2001 | Kumar et al. | 705/40 |
| 2001/0056362 A1 | * | 12/2001 | Hanagan et al. | 705/7 |

OTHER PUBLICATIONS

N. Asokan, et al., "The State of the Art in Electonic Payment Systems," 1997, IEEE computer, vol. 30, No. 9, pp. 28-35.*
David K. Gifford, et al., "Payment Switches for Open Networks," Jul. 1995, Proceedings of the First USENIX Workshop on Electronic Commerce, New York, 8 pages.*
Michael Waidner, "Development of a Secure Marketplace for Europe," Proceedings of ESORICS 96, Rome, Sep. 1996, 14 pages.*

* cited by examiner

*Primary Examiner*—Iuan Dam
*Assistant Examiner*—Eric B. Kiss
(74) *Attorney, Agent, or Firm*—Gregory A. Welte

(57) ABSTRACT

A software development system. An inventory of software modules is maintained. When a given system is to be assembled, modules from the inventory are selected for that system. In addition, modules not contained in the inventory are developed specifically for that system, and included in the system.

10 Claims, 13 Drawing Sheets

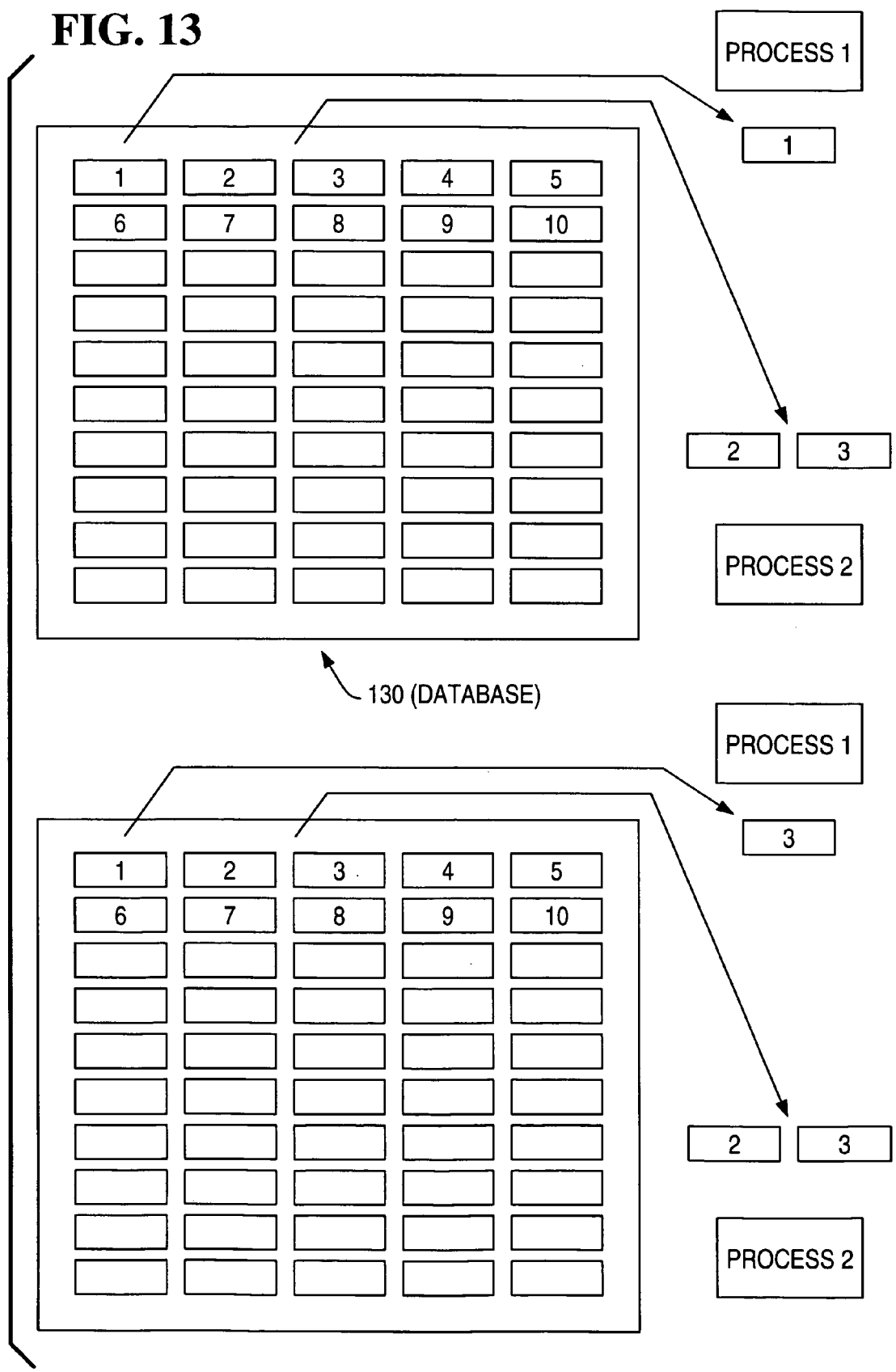

SOFTWARE DEVELOPMENT SYSTEM HAVING PARTICULAR ADAPTABILITY TO FINANCIAL PAYMENT SWITCHES

The invention concerns a system for (1) developing software, and then (2) modifying it when required, which (3) eliminates much of the wholesale writing-and-revision of computer code, which is ordinarily required in existing development approaches. The invention has particular applicability to financial payment switches.

BACKGROUND OF THE INVENTION

One problem existing in the prior art is the diversity of message formats used in modern communication systems.

When large organizations communication with each other through computerized systems, they commonly do so using "messages," which are packets of data. The messages contain not only information which the organizations wish to communicate, but also other information which is required by the equipment and systems which transport the messages.

For example, many messages are required to contain the address of the parties to which they are to be delivered. As another example, many messages contain error-correction codes which allow the recipient to predict whether the message received corresponds to the message sent and, if not, to request a re-transmission of the message.

As a third example, many messages are compressed. The type of compression used must be known to the recipient, and, to that end, the type of compression may be identified somewhere within the message. Alternately, the parties involved may agree, in advance, on a type of compression.

Thus, the messages contain multiple types of content, which may be grouped into two groups: (1) informational content and (2) transport-related content.

Many different conventions are available for packaging these two types of content into the messages. For instance, even in the simple examples just given, four types of content are present: (1) informational content, (2) recipient address, (3) error-correction codes, and (4) compression type. With four types of content, multiple possibilities exist for packaging.

Standards have evolved which prescribe how the content should be packaged. Both industry groups, and also governmental agencies, issue these standards.

However, the standards are numerous, they sometimes change, and new standards come into being. Because of those three factors, the following type of problem frequently arises:

Assume a given communication system is used by a given organization, and it utilizes messages conforming to a given standard. If that standard changes, then, in general, a large part of the software contained within the system must be re-written.

In addition, if the organization wishes to communicate with a new organization, which uses messages conforming to a different standard, then, again, a large part of the software contained within the system must be re-written.

This re-writing of software is time-consuming and expensive.

In addition, re-writing of software is required for other reasons than changes in formatting standards. Other standards apply to other aspects of the communication systems, such as communication protocols. For protocols, numerous standards exist, they change, and new ones come into being. Similar wholesale re-writing of software is also required for these changes.

Therefore, a major problem exists in achieving conformity of software systems to communication standards which are (1) numerous and (2) continually changing.

This type of problem occurs in communication systems utilized by financial systems, and particularly in "switches" used by electronic payment systems. The "switches" are components which handle the transfer of messages between the computers within the financial systems and the networks which carry the messages to other financial systems, which have their own switches.

OBJECTS OF THE INVENTION

An object of the invention is to provide an improved system for updating software systems.

A further object of the invention is to provide an improved system for updating software used in financial payment switches.

SUMMARY OF THE INVENTION

In one form of the invention, software-based systems are assembled from individual software modules. All systems contain certain modules, such as A and B, which are identical. Some systems contain modules which are not contained within others.

BRIEF DESCRIPTION OF THE DRAWINGS

FIG. 13 illustrates operation of a module in accordance with the present invention.

DETAILED DESCRIPTION OF THE INVENTION

1. Overview

Figure 1:
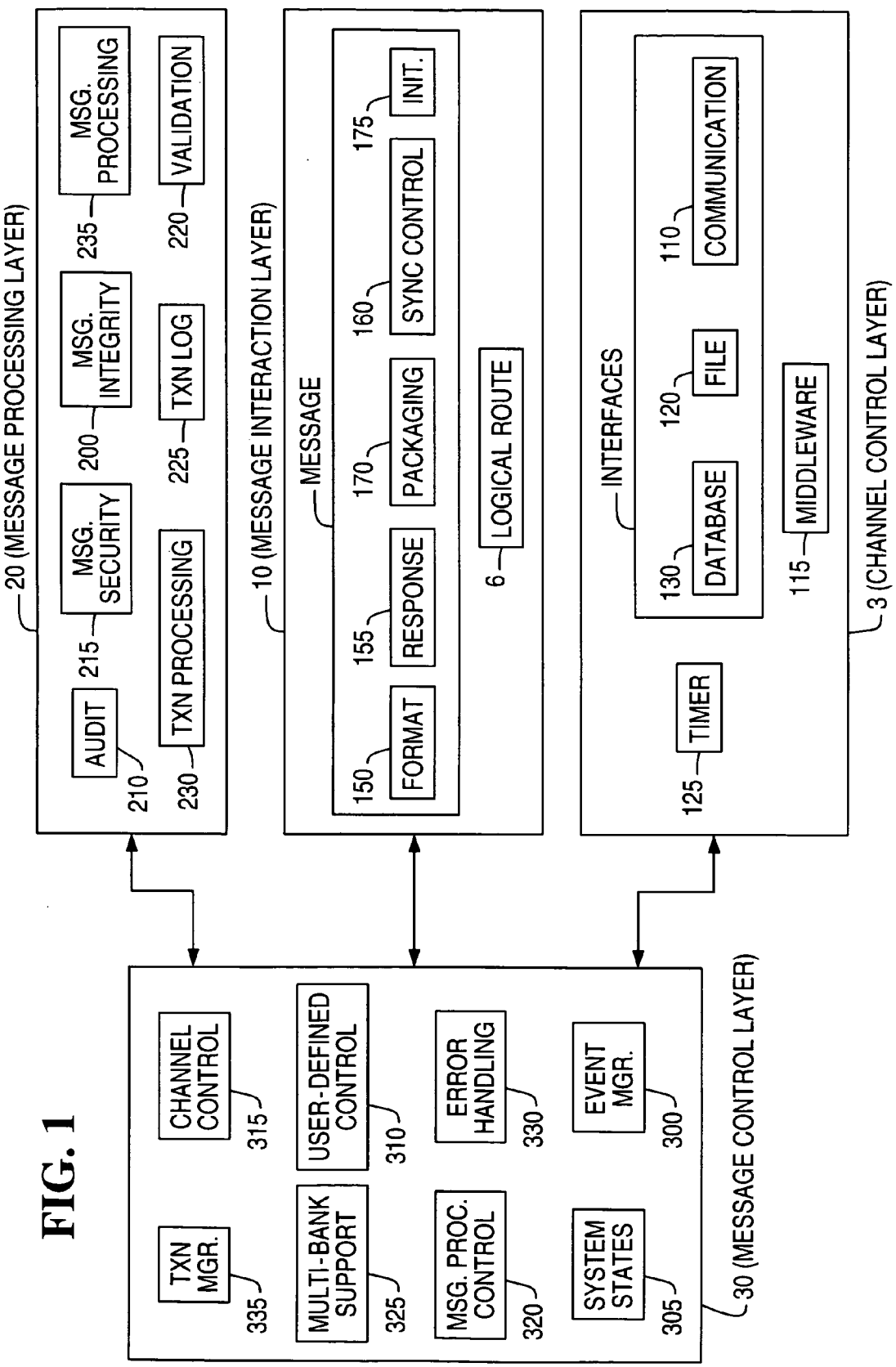
FIG. 1 illustrates one form of the invention, and shows an electronic payment switch having components designed by the invention.

The dual problem faced by all payment software system providers is either the lack of standards, and too many standards, in the electronic payment system market. The varying standards are exhibited in three major areas. Firstly, different types of electronic payment systems use different message sets. Common ones are ANSI and S.W.I.F.T. standards; and it is very common that each payment network have its own security standards.

Secondly, the protocol used in inter-connecting payment participants vary widely from a closed network using X.25 or TCP/IP to an open network using the Internet. As to the latter, when using the Internet, the legal requirements for acknowledgments, return, and rejection can differ even more between countries.

Thirdly, electronic payment systems are seldom stand alone systems. They have requirements to connect to existing host systems such as retail banking host or general ledger processing. These hosts range from simple systems to complex systems using the UNIX or WINDOWS NT operating systems.

All these variations mean that it would be more costly for electronic payment system developers to develop, manage and customize their own software. It would be even harder for the system to incrementally grow and integrate with new business requirements. The invention offers a unique approach to the problem.

First, a separation is made between (1) components common to all implementations and (2) components specific to given implementations of an electronic payment system. These components work together in a framework that is called the Electronic Payment Switch. Then, tools are built to assist the development of common components.

The invention employs three approaches:

1. Basic Framework—all electronic payment systems deal with messages. The behavior of such systems can be generalized and typified. Therefore, a framework can be built to process these generalized requirements. This framework is called The Electronic Payment Switch (EPSW).

2. Object Oriented Approach—each generalized functional area is represented by an object using Object Oriented Technology. The relationships between objects are well defined and standardized, allowing for flexibility to deal with variations within an object. For example, if a bank wants to use a different set of message standards than it has been using previously, then the Message Format Unit (discussed below) would be modified, rather than the entire system.

3. Incremental Reuse—as more and more electronic payment systems are implemented worldwide, the objects that have been designed can be mixed and matched within a basic framework. A previously developed object could be re-used with much ease, hence saving development effort.

The main benefit of developing a generic Payment Message Switch as a tool, instead of developing a specific payment application, is the reduction of development cost and time in the long run. Implementing a system becomes much quicker, more reliable and more cost effective. With proper framing, application system components can be re-used.

For instance, an inter-bank electronic check clearing system could be modified to become an intra-bank batched clearing system; a Real Time Gross Settlement System could be modified to do Intra-bank Electronic Fund Transfer (without settlement).

2. Introduction 2.1 Statement of Purpose

The purpose of this discussion is to describe the overall design of a generic Electronic Payment Switch (EPSW). The discussion includes an explanation of different Electronic Payment System (EPS) Models, and a discussion of the ability of the Electronic Payment Switch (EPSW) to service the various EPS Models.

In this discussion, the System Architecture of EPS and the various ways in which EPS may function will be considered. The advantages and disadvantages of each model will also be described. The design of a Message Switch will be described.

2.2 Organization of Discussion

The Architectural Overview section describes models of electronic payment systems and the behavior of these systems. Then, a high level description of the architecture of EPSW is provided. This architecture is layered by the functionality, protocols and object definitions.

The System Environment section describes the environment under which the Electronic Payment System would run. The hardware and platform software environment are discussed. The requirements and considerations for portability and distributed configuration are also discussed. Performance and related design issues are investigated.

The Payment Switch Design section describes the internal organization and working of EPSW. Each Layer of EPSW has a specific role, and each Unit within the Layer has a specific role. Each individual Unit and their interaction with EPSW is discussed in this section.

The Payment Switch Customization Design section describes the various interfaces that allow software engineers to use the framework to customize for their requirements.

3. Architecture Overview

This section describes various behavioral aspects of an electronic system. Behavior may differ from system to system depending on the requirements. A clear understanding of these behaviors are important because a payment switch must be designed in a very flexible way in order to support those differences.

The behavior of a payment system can be typified by the way it interacts with another payment system. This interaction is represented by Message Format and Protocol (FAP) standard. Messages that are sent and received carry the information to be processed. The exchange of messages between two or more parties in a payment system becomes the protocol of an Electronic Payment System.

Although FAP varies from system to system, typical processing Cycle remain the same. FAP is divided into three layers, as indicated in FIG. 1.

Channel Control Layer 3 is the communication level that associates a communication channel with the communication protocol, such as TCP/IP. Channel Control Layer 3 also associates the channel with a logical routing address and controls whether message interchange through middleware is being used. The exchange of information would involve both reading and writing to communication channels.

Message Interaction Layer 10 describes the behavior of payment messages. Behavior can be message format, e.g. S.W.I.F.T. or ANSI, acknowledgment, processing, and message bundling.

Message Processing level 20 deals with the processing of messages such as validation, security authentication and digital signature generation, transaction processing and audit trail etc. FIG. 1 depicts the three levels of FAP and additional software layers that are necessary in any electronic payment system.

The interactive control of all functions within the EPSW is performed by Message Control Module, MCM, 30. This layer of software spans across the entire system. The execution of any of the three layers of software is driven by the MCM 30 through events, I/O Control and State Machines.

The layering of the Payment Message Switch allows it to operate under various modes of operations. The following sections describe typical modes of operations in a payment system.

3.1 General System Architecture

3.1.1 Payment Message Exchange Models

This section describes two models in which a participant may exchange payment messages with a second participant. The models differ in the degree of directness (i.e., direct or indirect) of the communications between the parties.

In the first model, a payment participant communicates with a second payment participant through a centralized Payment Center. This is called Multi-Lateral Payment Processing. An example is found in Real Time Gross Settlement (RTGS).

In the second model, a payment participant communicates with another payment participant directly. This is called Bilateral Payment Processing, an example is Paperless Automated Check Exchange and Settlement (PACES).

Figure 2:
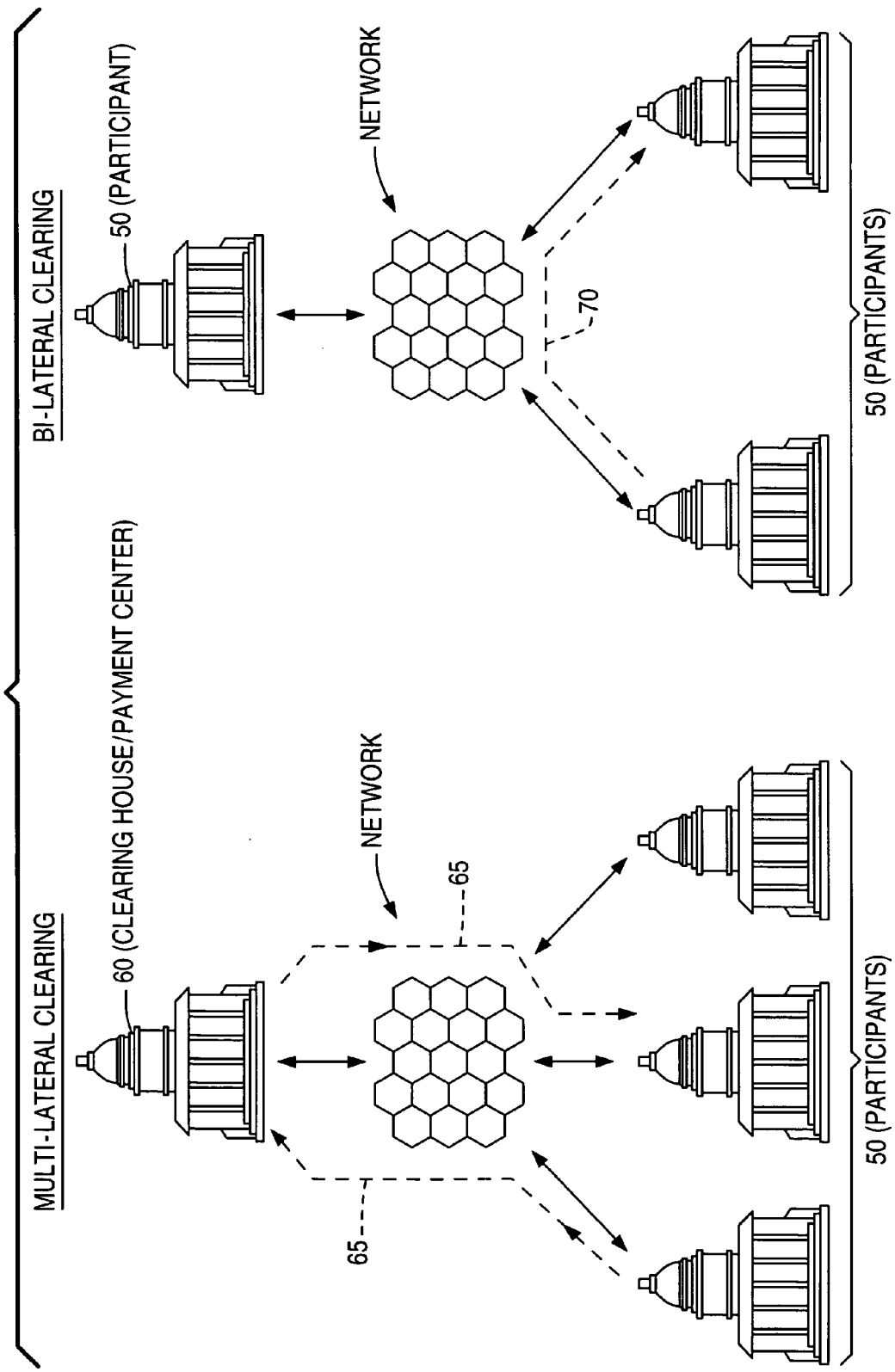
FIG. 2 illustrates definitions for two types of clearing for financial payments.

FIG. 2 depicts the two models, and contains labels as just described.

In the case of the first model, that is, Multi-Lateral Payment Processing, participants 50 would initiate payment transactions to send to the payment center, as indicated on the left side of FIG. 2. The payment center 60 would record the transactions, carry out settlement multi-laterally, and then forward the transactions to receiving banks. For example, path 65 indicates a communication path which may be used.

In this model, each participant must know the routing code of the receiving bank, which is the receiving bank code. Each Participant must know the physical address of the Payment Center, such as an IP address. The Payment Center must know both the logical and the physical address of all its participants.

In the case of the second model, that is, a Bilateral Clearing System, shown in the right side of FIG. 2, the exchange of payment instructions takes place directly between participants 50, as indicated by path 70. Therefore, each participant must know both the logical and physical addresses of all participants in the network.

3.1.2 Format and Protocol

Figure 3:
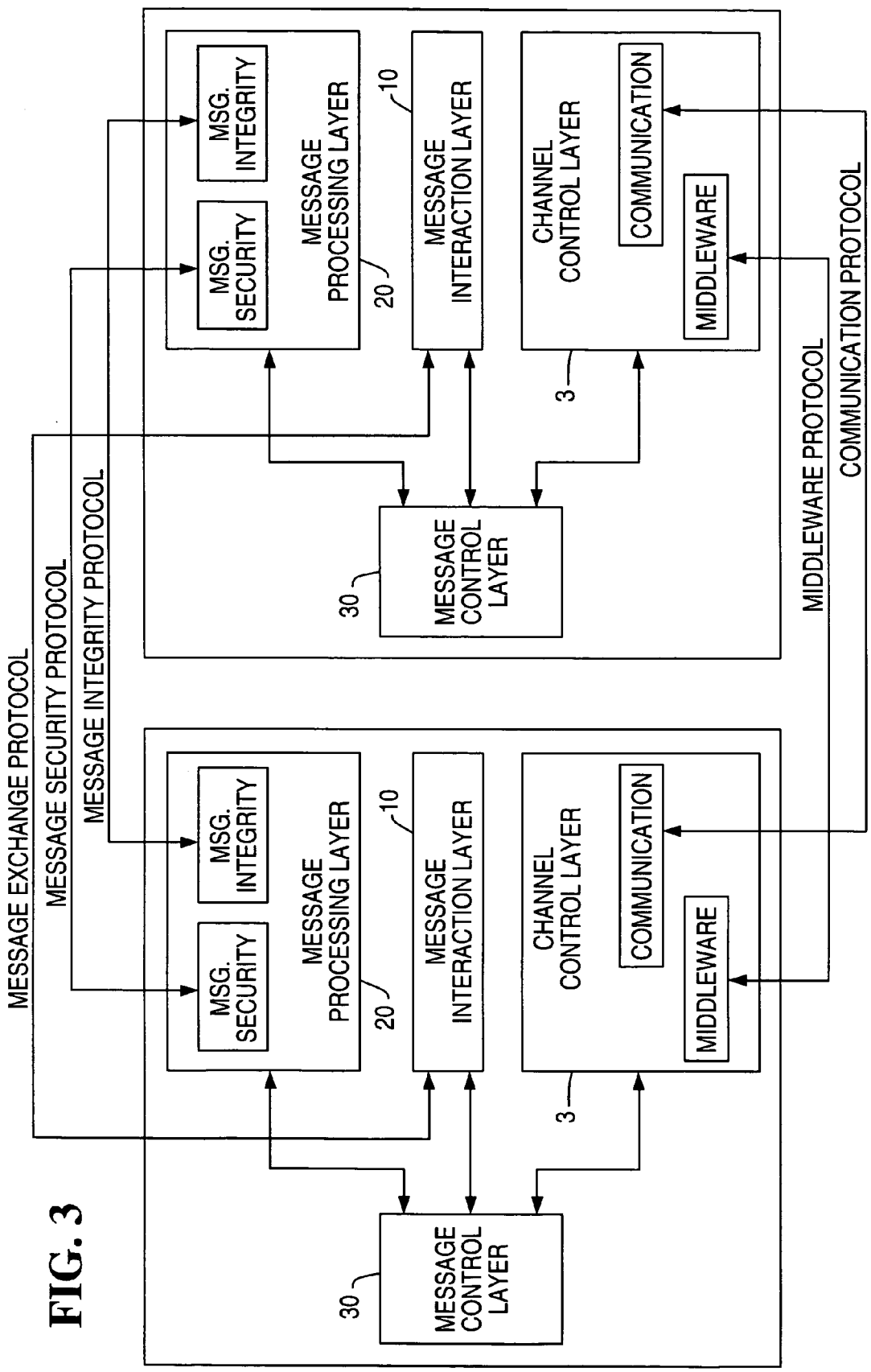
FIGS. 3–6 illustrate switches of the type shown in FIG. 1, and illustrate four types of transaction which the switches undertake.

In either message exchange model described in connection with FIG. 2, the connectivity can be performed by the generic EPSW. FIG. 3 indicates areas that require matching message format and protocol to allow processing to take place: the double arrows indicate modules which must conform to matching formats and protocols. Specifically, these modules are: (1) the message modules within the Message Interaction Layers 10, (2) the message security modules within the Message Processing Layers 20, (3) the message integrity control modules within the Message Processing Layers 20, (4) the communication protocol modules within the Channel Control Layers 3, and (5) the middleware modules within the Channel Control Layers 3.

EPSW communicates with another payment participant using the same network protocol as the participant. The communication protocol could be TCP/IP or SNA. It could also use a middleware such as TOP END to control the flow of the payment message. Network communication is performed by the Channel Control Layer 3.

Both EPSW would use Message Interaction Layer 10 to interpret message format, which is communicated in the form of a stream of bytes. Both switches in FIG. 3 need to understand whether it is necessary to process an acknowledgment; or how a message is packaged, such as single payment in a message, or multiple payments in a message, or all payments batched in a file.

Both also need to know whether the sender should wait for the receiver to reply immediately (synchronous); or the sender would get the reply from the receiver later (asynchronous).

The sender may write the transaction files onto the receivers' machines, which is the PUSH model, or the receiver may request a file from the sender, as in a PULL model. EPSW is designed in such a way that it could become a sender, a receiver or both.

This section discuss the various roles which the payment message switch will play in an entire payment system.

3.1.3.1 Payment Initiation

Figure 4:
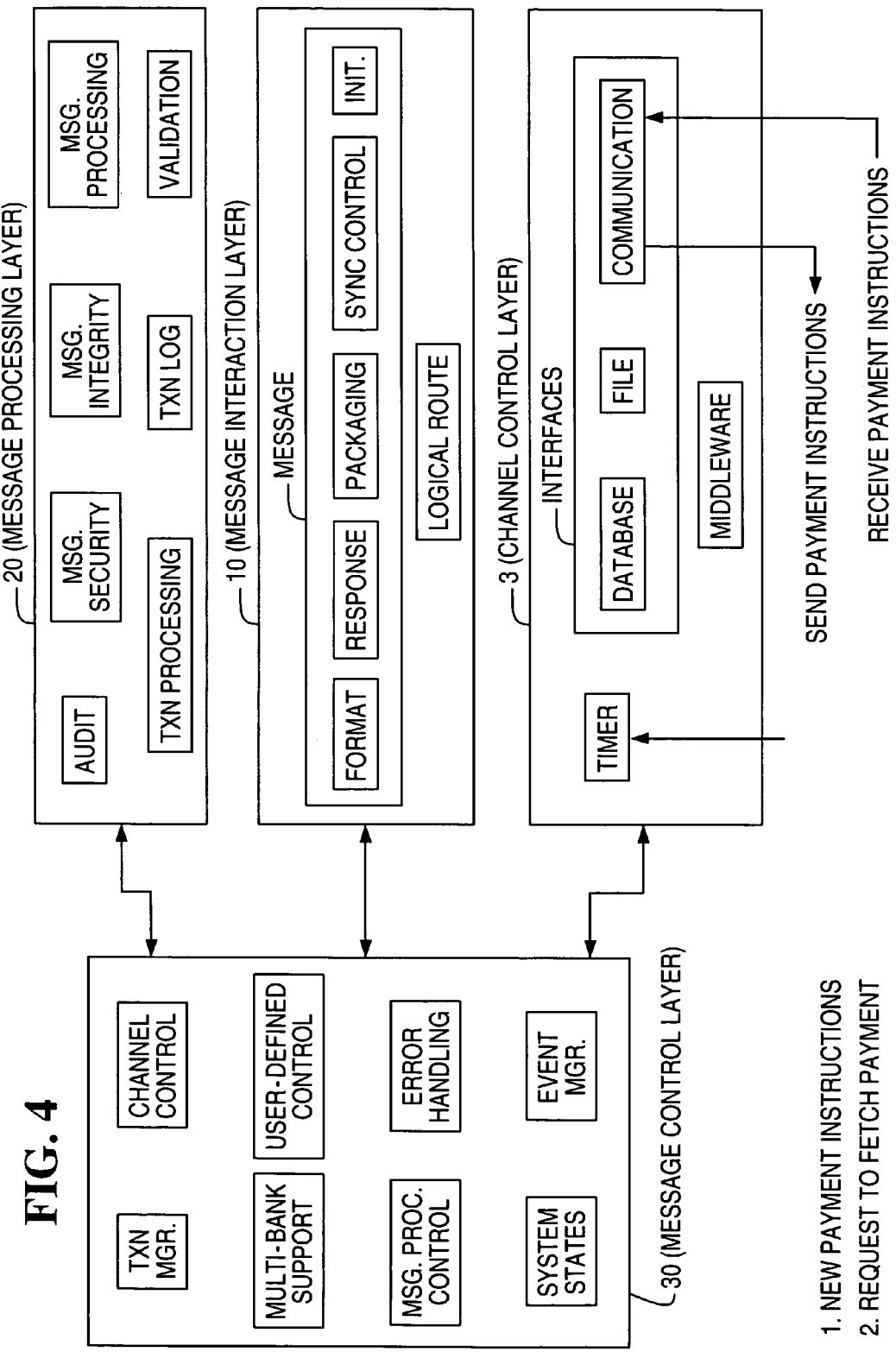

The financial institution or person who initiates a payment transaction would typically use EPSW to package the payment instruction on its local computer and then forward the transaction in a standard format to the other party. The internal processing architecture is depicted in FIG. 4.

Payments are typically initiated from a number of sources, including the following three:

1) Database—data would be stored in a data store either directly by the user or a host computer. EPSW would fetch the payment instruction from the data store for processing.

2) Inter-process communication—a notification is sent to EPSW to indicate that a payment instruction has arrived for processing.

3) Timer—an alarm mechanism would periodically signal that it is time to retrieve payment instructions to send, or it can poll the other party to check for any new information to download. Polling is required if the designer decides to implement a PULL model.

Once a request enters EPSW, either to send a payment instruction or to poll, the processing unit would be responsible for deciding what processing to undertake. This unit is meant to be independent from the message interaction and processing layers 10 and 20.

3.1.3.2 Payment Switching

Figure 5:
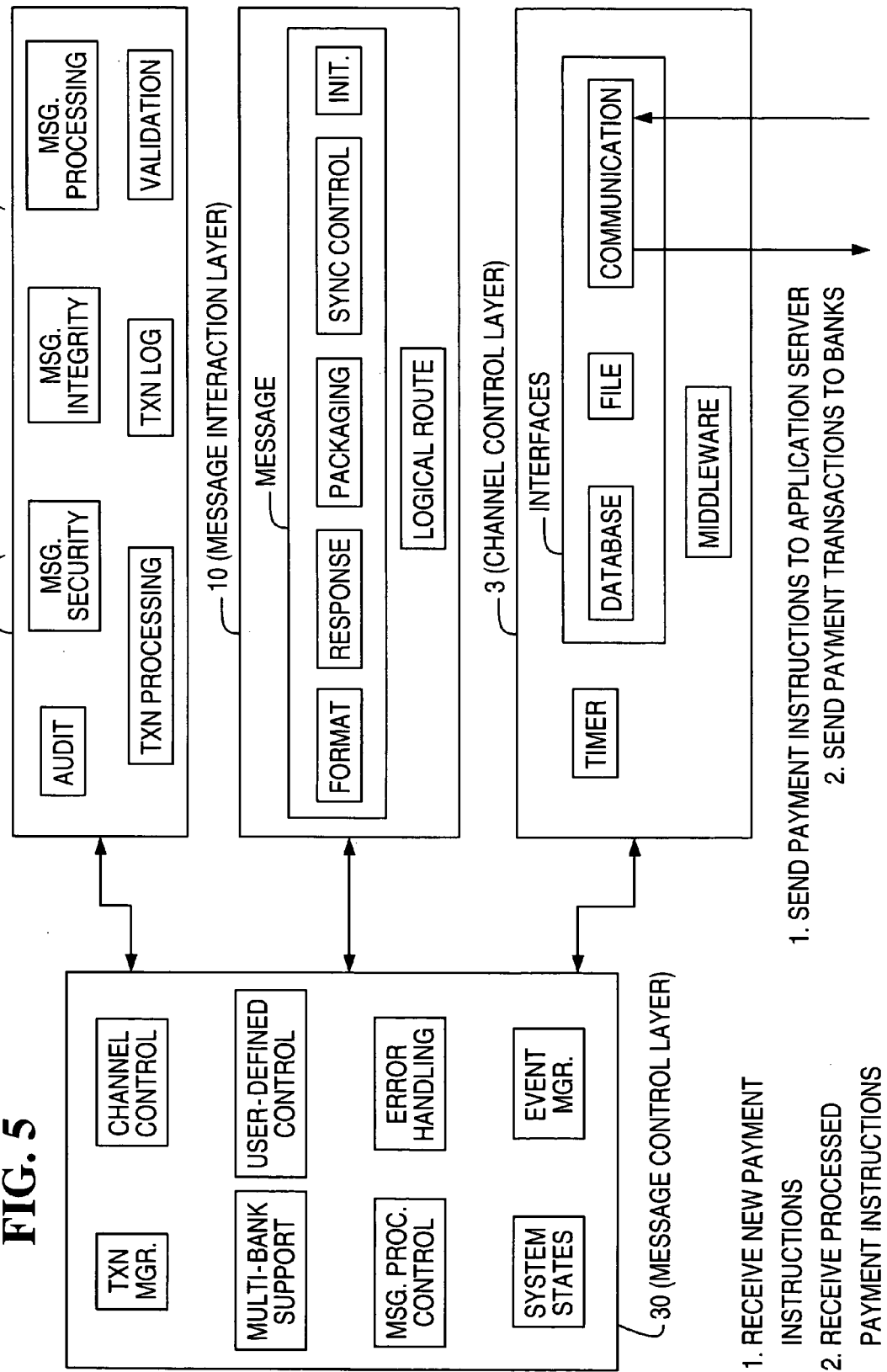

Payment Switch is responsible for receiving payment transactions, and forwarding transactions to application servers for processing. It would also distribute processed payment transactions to designated financial institutions or banks of which it is servicing. FIG. 5 depicts its role.

EPSW receives and sends payment transactions. Payment transactions received and sent can either be in a defined message format or internal data representation. The following are typical message exchanges:

Received from external participant—in a defined message format, e.g. S.W.I.F.T.

Send to Application Servers—in an internal data representation, ready for processing.

Receive from Application Server—in an internal data representation, ready for Message Interaction Layer to process and send to external participant.

Send to External Participant—in a defined message format, e.g. S.W.I.F.T. EPSW is driven by incoming requests in form of a standard message format or internal data representation.

If the request is in a standard message format, it would invoke Message Interaction and Message Processing 10 and 20 layers to turn the message into a usable internal format. The Message Response Unit 100 would work out how to deal with the message.

There would be four possible courses of action:

1) No more processing is needed;

2) Create one or more messages (in internal format), e.g. acknowledgment processing;

3) Route original message; and

4) Route newly created message.

3.1.3.3 Application Servers

Application Servers are independent processes that are responsible for application processing. Application Servers can use the EPSW frame for sending and receiving messages. There is a Message Processing Unit that would carry out the actual application processing of the payment transaction, such as updating accounts and general ledger tables.

Figure 6:
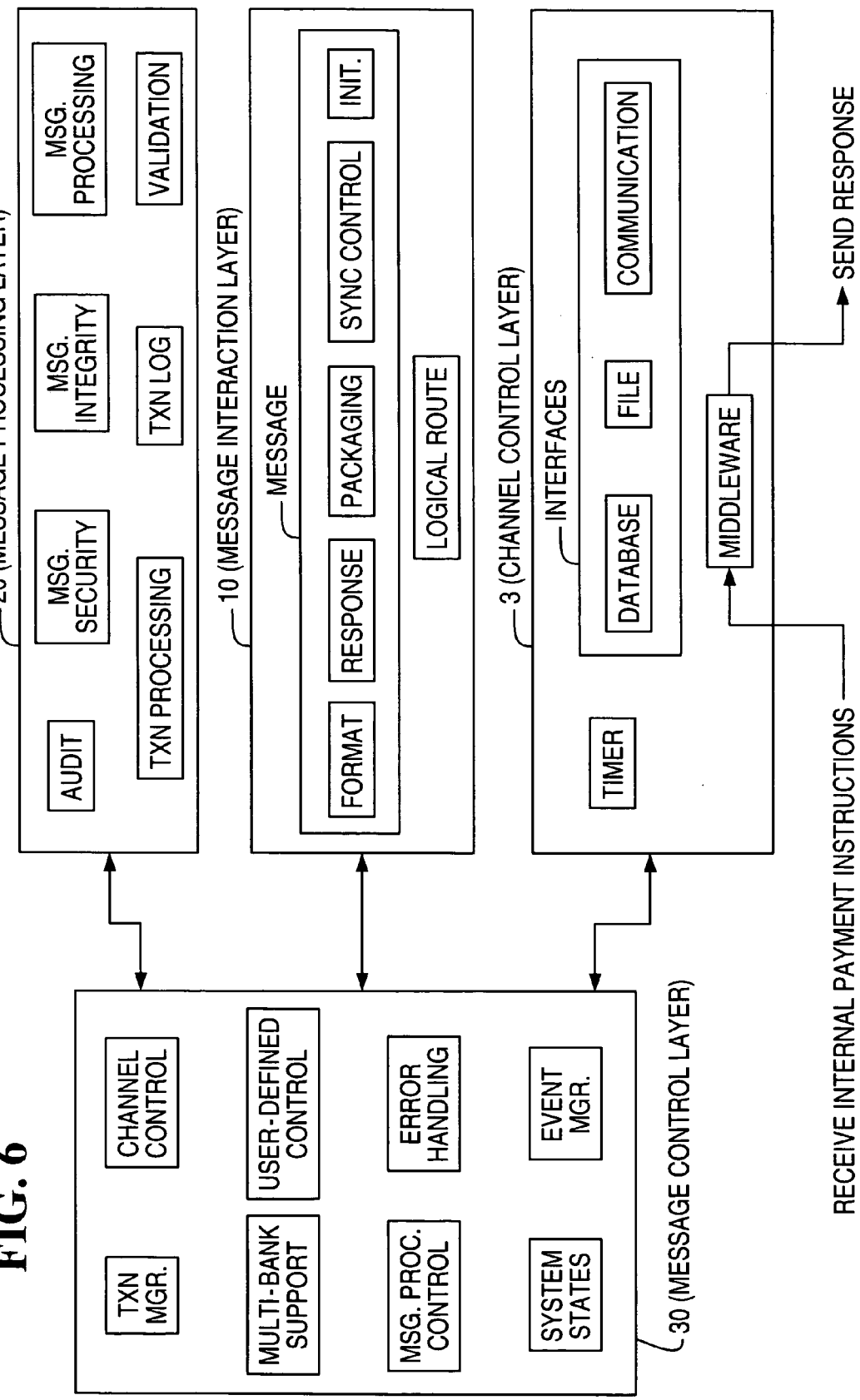

Application servers would receive requests from EPSW. Requests are passed in the form of internal data format. This format is readily usable by the Application Server. FIG. 6 depicts the structure of the Application Server.

When requests are received by an Application Server, it would firstly try to understand what the request is, and then pass the request to the Message Processing Unit for processing. After processing is complete, the Message Response Unit would decide what response needs to be generated. One or more responses would be generated by the application server to EPSW to forward to the participants.

3.1.3.4 Network of Payment Services

EPSW can be used to build Payment Initiation Process, Payment Switch, and the Application Server. This generic facility allows easy configuration and customization of a payment system. This section describes inter-connectivity of payment engines to form a payment system.

In the case of a multi-lateral payment processing model, say a RTGS system, participants would initiate payment transactions to send to the payment center through a Wide Area Network, WAN. Payment messages exchanged between the Payment Initiator and the Payment Center are encrypted and protected.

The Payment Center uses two services to process payment transactions. The Payment Switch is responsible for the delivery and receipt of payment transactions to participants; and the Application Servers are responsible for the actual processing. This framework provides flexibility in that the Application Server and EPSW can be combined should the designer consider a combined model more appropriate.

Figure 7:
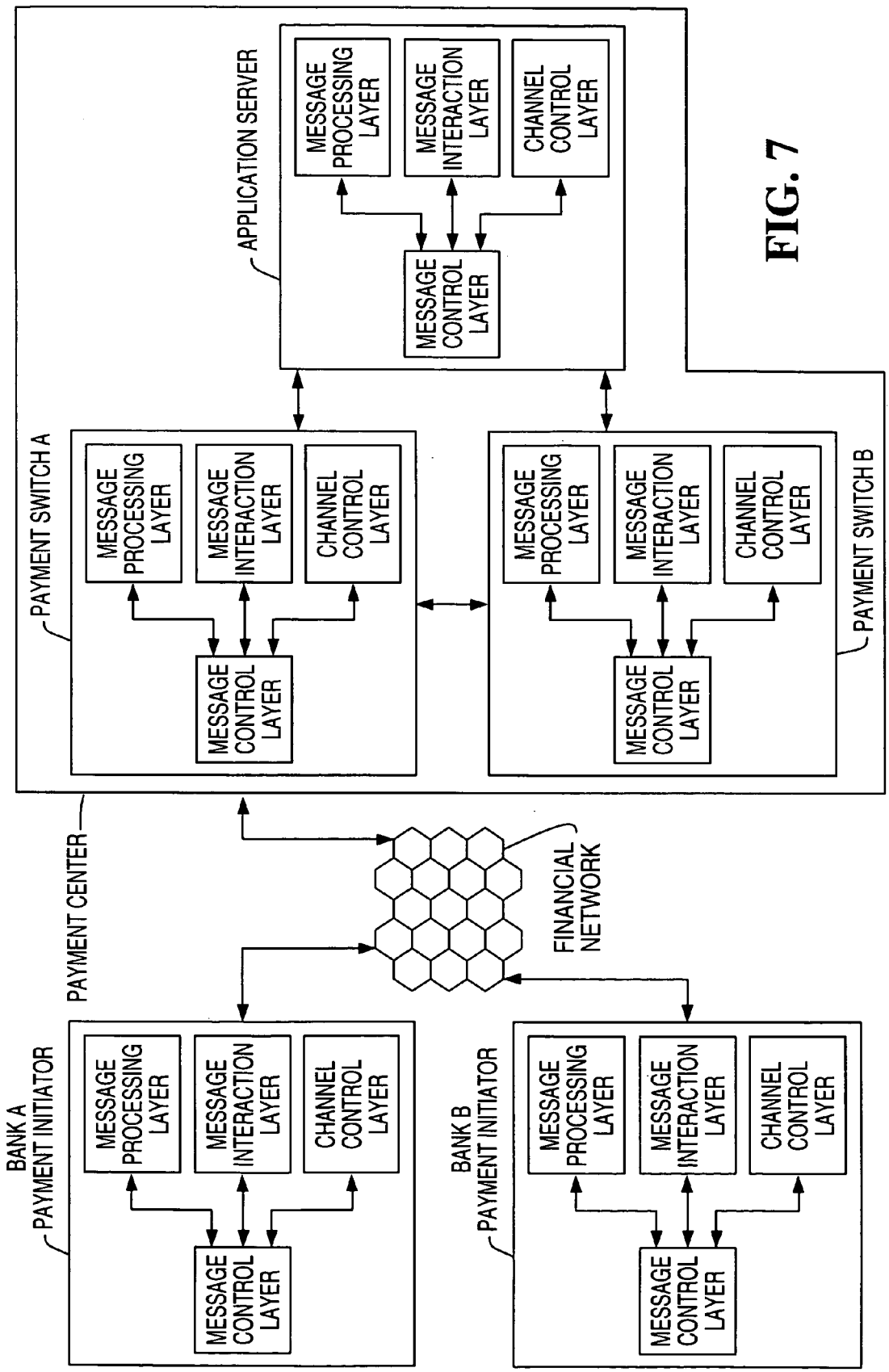
FIG. 7 illustrates one type of communication relationship among several switches of the type shown in FIG. 1.

FIG. 7 depicts the more complex model. In a payment system, Bank A and B would normally logon to the Payment Center by sending logon requests in form of messages to the Center. Payment Switches running at the Center are responsible for serving Banks A and B respectively, and they would try to understand the messages sent by the banks. Payment Switch responsible for each bank would then break down the message and pass on useful data to the Application Server to be processed. For logon processing, the application service is provided by the Security Server in this case. Once the bank successfully logon to the system, it could legitimately start initiating payment transactions.

Payment transactions are interpreted by The Payment Switch and useful data is sent to the RTGS Application Server for processing. The RTGS Application Server would decide whether settlement would take place, and send its processing result to The Payment Switch that is responsible for the respective bank. The Payment Switch would translate the information into payment message and then send the message back to the bank.

With RTGS, there can be various ways with which processing is done. A RTGS server may send two messages to notify the presenting and beneficiary banks. Another RTGS configuration may require the RTGS server to send three messages to presenting bank, beneficiary bank and delivery system. The flexible configuration allows designers to easily specify and customize requirements for customers.

3.2 Channel Control Layer

Communication of information, or messages, are carried out by the Channel Control Layer 3 in FIG. 1. This Layer 3 is responsible for the transmission of information across the network. This layer of software would work independently from all other layers of software. The design and implementation of this layer of software would allow EPSW to adopt to different types of communication protocol and middleware.

There are five units within this layer 3:

1) Communication Unit 110—this unit is configurable to specify the communication protocol that would be used between the two parties. Some of the communication protocols supported are TCP/IP, SNA and X.25. This unit supports both external communication as well as Inter-Process Communication (IPC).

2) Middleware Support Unit 115—Some banks may decide to use a Middleware product to implement their payment systems. The middleware product has in-built capabilities to guarantee delivery of payment messages and provide high availability features. In addition, some middleware products also provide XA transaction processing compliance transaction manager. This unit could integrate into the Payment Switch seamlessly over the chosen communication protocol.

3) File Interface Support Unit 120—this unit is responsible for interfacing with files, such as locating an input file, and opening, reading, and writing to a file. It is also responsible for sending and receiving files. Since some payment systems deal with transactions at the file level instead of the message level, it is necessary to include this unit 120 at this level. lowing easier modification of the system and maximum flexibility.

4) Timer Unit 125—this unit is used to handle trigger mechanisms when a payment transaction is ready. The mechanism could also be an alarm clock that signals time for the process to initiate a read from some data source.

5) Database Interface Unit 135—this is the unit where physical access of data is carried out. Programmers must program within this unit to indicate how to read the data.

All units would work together to provide a communication layer of software which is totally transparent to the calling software. This layer 3 of software could handle multiple channels simultaneously. Each channel may have a different communication protocol and connect to different parties.

3.3 Message Interaction Layer 10

The Message Interaction Layer 10 in FIG. 1 defines the format and protocol of message exchange between two entities. An entity can be a Payment Participant, a Payment Switch or an Application Server. These entities exchange messages in external format and internal format, so these messages are called External Message and Internal Message respectively.

An external message is a representation that has a well defined industry standard format and the message is passed as a string of characters. An example is S.W.I.F.T. format. The two parties that exchange External Message Representation are usually different organizations of a payment network.

An internal message contains data ready for internal processing. An internal message is transferred within a single organization between processes or machines. An example is passing payment transaction from the Payment Switch to Application Servers to process.

The information transferred is well defined and readily usable by the machine. There is usually a one-to-one mapping between an external message and an internal message since an incoming message will need to be translated into an internal message before processing and vice versa.

There may be additional internal message and internal data representations that are used between application processes for event signaling and handling purposes.

There are six units within the Message Interaction Layer 10. They represent different aspects of the message FAP. The entities exchanging messages would have to understand FAP through these units.

1) Message Format Unit 150—this unit defines message formats that are exchanged between entities such as Participants, Payment Switch and Payment Servers. The message format can either be an external message or an internal message. The unit 150 understands the format transformation between an external and internal message.

2) Message Response Unit 155—this unit defines for each internal and external message when processed by an entity, what message response(s) is required. For instance, upon receiving a payment instruction, the Payment Switch would respond by an acknowledgment.

3) Message Synchronicity Unit 160—This unit controls the message delivery and response behavior of an entity. For the sender, whether it will wait for a response after sending a message. For a receiver, whether it will respond immediately.

4) Message Packaging Unit 170—this unit is responsible for packaging external messages for transportation and interpretation. One or more external messages may be packaged into a single buffer for read/write. A message can also be a file handle to access a batch file.

5) Message Initiation Unit 175—this unit defines how participants of a payment system transfer messages. The participants may work in a client/server model where the client always initiates to send messages or initiates to retrieve messages (PULL Model). The participants may work in a co-operative manner where both parties deliver messages to other participants in an asynchronous manner (PUSH Model).

6) Message Routing Unit 180—this unit defines the route of a message (internal or external) once a response is to be initiated. Each message that travels outside of an entity would require the routing information to be associated with it so that the entity understands where to send the message. The internal route could be a server ID and the external route could be a participant ID.

These units within the Message Interaction Layer 10 have a well defined interface with Message Control Module 30. The Message Control Module 30 controls the logic of processing a message, and the Message Interaction Layer has knowledge of message behavior. The two layers 10 and 30 interface with each other through a well defined mechanism to allow knowledge of control and knowledge of processing to be separated, this separation enables more flexible configuration of EPSW.

3.4 Message Processing Layer 20

The Message Processing Layer 20 contains a number of units that are common to all message processing within the entity. For instance, an incoming external message would need to be authenticated by the Message Integrity Unit 200, and an outgoing external message would need a new message authenticated code generated. The following are the units and their responsibilities:

1) Audit Log Unit 210—all external messages exchanged will need to be audit-logged.

2) Message Security Unit 215—this unit is responsible for the encryption and decryption of the external message and it is also responsible for generating or authenticating digital signature.

3) Message Integrity Unit 200—this unit is responsible for checking missing payment transaction and duplicate payment transaction. It has the knowledge to decide what has been processed, allowing recovery process to be carried out in case of error.

4) Validation Unit 220—all validation requirements of a message are defined here. This is not a format validation since most format validation is the responsibility of the Message Format Unit 150. The validation of Validation Unit 216 is application validation to check data integrity and correctness.

5) Transaction Log Unit 225—this unit defines the database operations to be carried during processing of the message.

6) Transaction Processing Unit 230—this unit defines the commit cycle of the transaction. This is useful if another architecture such as a highly distributed environment and transaction processing is necessary. A client may, through this unit, define the transaction boundary of a transaction.

7) Message Processing Unit 235—this unit allows the users to program specific message processing. This is also an user exit which allow programmers of the system to add the application processing logic. For instance, Member Bank System could obtain the data from either a user entering payment transactions, a host system or other means. Application Server would process the transaction, update the database and send responses to Payment Switches.

3.5 Message Control Module 30

The Message Control Module (MCM) 30 in FIG. 1 is responsible for the control flow of the entire EPSW. It controls the flow of objects and their processing. All the other layers of software would register with MCM, and MCM would use decision tables to drive the flow of execution of objects as they are created and destroyed.

Although there are a number of units within MCM 30, some are generic to EPSW and some are application specific. For instance, the Event Manager Unit 300 registers and dispatches events and it is generic to all applications. The units within MCM are described below:

1) Event Manager Unit 300—The event manager registers and dispatches events using the state-event table. Each processing unit that requires event handling facilities would register its state-event table with the Event Manager. As events take place, the Event Manager would decide which unit should be activated, and pass on the necessary information to activate the unit. There can be many areas where events are used, a generic Event Handler is provided for each Unit. The event handling mechanism enables better de-coupling of independent units in such a way that they do not have to assume the logic of each other, allowing easier modification of the system and maximum flexibility.

2) System States 305—Here designers specify global states which govern the processing of a switch. For instance, a particular time-of-day would influence how EPSW processes certain transactions. Instead of building such conditions into each unit, interested parties would be notified by events.

3) User Defined Control 310—through the event handling mechanism, events are registered and checked by the responsible units. These responsible units would be alerted and scheduled to take over processing. For instance, in processing a batch file, a processing unit would need to check whether there is a matching trailer record for a header record, this transfer of control could easily be defined using this mechanism.

4) Channel Control Unit 315—the Channel Control Unit 315 is used to control I/O channels to read and write messages. It interfaces with internal data access layer and communication Layer. Once a message is read, then it activates other processing units to ensure that this message is processed.

5) Message Processing Control Unit 320—This unit 320 interfaces with the Message Interaction Layer 10 to control the processing flow of decomposing an external message into an internal message. In addition, this unit would pass control of the internal message to Message Processing Layer 20 for further processing, and then pass the result back to Message Routing Unit 6 for out-routing.

6) Multi-bank Support Unit 325—this unit is used to support multiple bank connections. It would keep track of the current processing thread and all the local data for each bank.

7) Error Handling Unit 330—this is the exception handling which deals with error reporting as well as error handling. Designers may specify 1) how to report error; 2) how to react to error, e.g. logging or negative acknowledgment; and 3) how to recover from an error e.g. retry.

8) Transaction Manager Unit 335—this unit provides utilities to begin a transaction and commit a transaction. This unit allows transaction boundary to be defined in a much more flexible manner.

EPSW Core contains a part of the system that does not allow any modification by application developers. There are a number of pre-defined interfaces where designers could insert their programs, these interface either come in pre-defined tables for code generation or standard Application Programming Interface (API).

4. System Environment

EPSW is designed and developed for the UNIX environment. The language used is C and C++, and programs will conform to the proposed ISO/ANSI C++ standard November 1997.

4.1 Physical Environment 4.1.1 Minimum and Maximum Configurations

There is no minimum or maximum configuration. The performance of the software is dependent on the hardware and the application software.

4.1.2 Hardware Interfaces

Part of the libraries would interface to communication services provided by the hardware platform. They are platform dependent and would be developed as requirements arise.

4.1.3 Equipment Supported

The initial release of the software would be on a platform such as that designated as Model Number 4400, available from NCR Corporation, Dayton, Ohio, USA, which supports MP-RAS 3.02.

4.2 Operational Environment 4.2.1 Operating Systems

The initial operating environment is MP-RAS 3.02 on Intel. A port to Solaris V7 Intel may be available in subsequent version. Part of the software, such as Message Translation Unit, may also be ported to NT 4.0 environment, but at this stage, there is no plan to have EPSW run on NT until version 2.0.

4.2.2 Development Tools

EPSW is developed on NCR MP-RAS 3.02, it will support TOP END 2.05 and Oracle 8.1. As more applications are implemented using EPSW, the tools that EPSW support would increase.

4.3 Connectivity Model

EPSW is designed to handle distributed computing. The inter-connectivity of EPSWs to carry out payment processing is described in the earlier sections. The following is a list of protocols that EPSW supports: Bank Connectivity Model to Payment Center through wide area network using TCP/IP protocol, Inter-process communication.

4.4 Performance and Scalability

EPSW is designed to be flexible and scalable. The performance issues of a system designed using EPSW are the following. Database access and lock management I/O access, especially in the area of disk contention; Network access; and CPU loading.

Performance issues may be resolved by using middleware to spread processing to multiple nodes. This is an architectural issue that each system designer would need to consider carefully.

5. Payment Switch Design 5.1 Message Control Module 5.1.1 Event Manager

Different aspects of the system, such as message processing flow control, validation, security control, etc, are each packaged as a separate unit in the system. This makes the design of each system aspect easier as they are more confined to their particular domain. Moreover, it minimizes the effect that modification to each system aspect has on the system as a whole.

For example, replacing the security control mechanism involves modification to the security unit only, as long as the interface between the unit and the system frame remains intact.

These units, however, need to work together to provide the system the functionality it needs. Changes to one unit may trigger operations on one or more other units, which may in turn change their states and trigger a chained reaction on more units. For example, a failure on security check of an incoming message may lead to generation of a reject message, which needs to be processed and sent to the peer system. This would require operations on the security control unit, message response unit, message packaging and formatting units, message integrity unit, channel control unit and depending on the message type, may change a number of system states.

Communication between the system units are many-to-many, by which each system unit may trigger operations on any other system unit. Adding one system unit thus requires adding interface to all existing units that are expected to communicate with it. This makes the interface very complicated and makes system maintenance and expansion difficult.

The Event Manager 300 is designed to bring this many-to-many communication down to a more manageable, extendable and easy to understand many-to-one communication. It is designed to act as a mediator responsible for controlling and coordinating the interactions among the system units. Each system unit would register with the Event Manager for specific events that are of interest to it. System units are then responsible for notifying the Event Manager by means of raising an event when they undergo a change in state or when something significant happened, for example, message validation failed. The Event Manager would then propagate the event to interested parties, i.e. units registered for the event.

With this model, the system unit sending the notification need not specify explicitly the receiver of the events. System states are encapsulated in a state machine registered with the event manager as one of the event handlers. To inquire about a particular system state at some point in time during message processing, the processing code may raise the corresponding event to the event handler instructing it to advise of its current state or perform some agreed upon action according to its current state.

Taking the login state for example, upon successful processing of a logon/logoff request message, the system should change to a logon/logoff state respectively. System states are most likely encapsulated in a state machine registered with the event manager as one of the event handlers. To instruct a system state change at some point in time during message processing, the processing code may raise the corresponding event to the event handler instructing it to change its state.

5.1.2 The Message Processing Unit

The Message Processing Unit 235 is an event handler whose main responsibility is to drive the processing flow of messages. It is responsible for handling both messages that come into the system and messages leaving the system. This unit maintains two message queues, the Request Queue and the Response Queue.

All messages that request system services will be entered into the Request Queue, these are mainly messages received from external parties. Requests may generate responses. These response messages are entered into the Response Queue.

The Message Processing Unit is designed to perform message processing on a transmission base. All requests that come in one transmission will be inserted into the request queue one by one and be processed altogether. Responses corresponding to one input transmission will all queue up in the response queue, and be processed altogether after processing of all related requests completed, unless instructed explicitly by events to the message processing unit.

This design provides support for message packaging-related processing which is concerned with the group-level processing required by a set of messages transmitted in one single buffer read/write. The exact context of a transmission buffer is encapsulated within the input/output unit which handles the physical read and write of message buffers. Upon a successful buffer read, the input/output unit would notify the message processing unit, by means of events, that an input-transmission begins. And then each message in the buffer is submitted in order by the input/output unit to the message processing unit for processing.

Upon end of buffer, the input/output unit will notify the message processing unit that the input-transmission has completed. During this phase, the message processing unit does not actually carry out any message processing other but stores the messages in its internal data structure, the request queue. Actual processing begins after the message processing unit has gathered each and every message in the input-transmission buffer, and this is signified by receiving the end-of-input-transmission event from the input/output unit.

Response messages are also processed on a transmission base. All response messages generated from one input-transmission are processed altogether. When instructed to start processing its response queue, the message processing unit will notify the input/output unit, by means of events, that a new output transmission begins. It will then process each message in the response queue in turn and submit each to the input/output unit.

When it is done with the response queue, it will notify the input/output unit that the output transmission completed. Upon receiving this event, the input/output unit would package the response messages into one transmission buffer and send them out. When actual processing begins, be it on the request or response message queue, the message processing unit first invokes the begin-transmission code defined for the first message in the queue. Then for each message in the queue, the first and last message inclusive, the corresponding processing code will be carried out.

Finally, the end-transmission code defined for the last message in the queue is performed. The begin and end transmission code are message packaging related code defined for each message type.

The Message Processing Unit is event driven. All operations that it performs correspond to the events that it receives. For example, it does not start processing messages on the request queue until it has been notified, through event raised by the input/output unit, that it has received the last message in the input buffer. By the same token, it does not start processing messages on the response queue until it has been notified, through event raised by itself, that it has completed processing on the last request message, or at some other time instructed by the request message type being processed.

By default, upon completion of all request message processing, the message processing unit would initiate an event back to itself instructing it to start processing messages on its response queue. This rule, however, can be over-ridden by explicitly raising the corresponding event within the processing code of a request message. This is usually done to achieve a specific outgoing message packaging effect, particularly if we want the responses to be sent on separate transmissions.

If this is desired, the request message processing code must be able to identify when a response transmission should end, and explicitly raise the process-response event at the right time. When processing of request queue begins, the message processing unit first raises an event back to itself to clean up its response message queue. This is done to make sure that the next output-transmission will only contain response messages corresponding to this input-transmission.

5.1.3 System States

Each application system would need to maintain a number of system states. For example, one particular system may provide a number of facilities, like Real Time Gross Settlement and Batched Net Settlement. Each user must log on to the particular service to use the particular facility.

The system may need to keep a table of user logon states on a service by service base. Whether a particular request will be entertained would depend on the current user logon state. These system states would best be represented by state machines. Each state machine will record one set of allowable states for a particular system aspect, together with the events it expects to handle at each state, and the action to carry out upon receipt of the events.

Taking the logon example, upon system startup, all services will default to a logoff state. At this state, they may expect to handle logon, logoff, and service-request events.

Upon receipt of a valid logon event, the service will move on to the logon state, and a positive acknowledgement message will be issued. Upon receipt of any event other than the logon event at the logoff state will result in a rejection.

The service will remain in the logoff state, and an negative acknowledgement will be issued. All the above will be tabulated into a four column table, which specifies a row for each of the (1) current state, (2) event, (3) next-state, and (4) actions taken. This facilitates a table lookup mechanism by which the state machine will then use the current-state and an event as input to the table lookup and retrieve the next-state and action to perform.

The (next-state, action) pair retrieved will depend on the current state and the event. For example, when current-state is logoff and event is valid logon request, the next-state retrieved may be logon and the action to perform is to generate positive acknowledgement. And while the system is already in logon state, a second valid logon request event will end up retrieving a next-state of logon and the action to perform being to generate negative acknowledgement.

Each state machine must specify an initial state upon construction which will become the first current-state of the machine. Next, the state machine registers itself with the Event Manager 300 for all possible events that it is interested in handling. When one of these events is realized and generated by a system component, e.g. the user logon request may be detected by the message processing control unit, the component raises the corresponding event to the event manager, who in turn will dispatch the event to all interested handlers, of which the state machine, e.g. the logon state machine, is one of them.

In short, for each state machine, the application system designer must provide: an initial state, a (current-state, event, next-state, action) lookup table, and a set of action routines. Upon construction, the system will register the state machine with the event manager for each event stated in the lookup table. The state machine will have a default handle-event routine as a handle for the event manager to notify it of event occurring in the system.

When someone raises the events to the event manager, the event manager will invoke the handle-event routine provided by the state machine, passing in the event ID and a pointer to the component raising the event. The state machine will then do a table lookup on current state and event, and retrieves the corresponding next-state and action pair, sets current state to next-state and passes control to the action routine.

5.2 Message Interaction Layer 5.2.1 Message Format

The message format unit 150 is responsible for managing the formats of messages that are exchanged between various entities, such as Participants, Payment Switch and Application Servers. Two types of message formats exist:

Internal Message Format—this defines the message format of all messages that are used for processing within a single entity, e.g. the Participant, the Payment Switch or an Application Server. It should be designed in a format that is most suitable and effective for processing purposes. For example, each message may be defined as a class with the message content contained as data members.

External Message Format—this defines a message format for messages that are exchanged between entities. For example, an External Message Format, say Format A, may be agreed between Participants and the Payment Switch at the Payment Center. Another External Message Format, say Format B, may be defined for exchanges between the Payment Switch and the Application Servers. Since Format A is used for message exchange between external entities, it is very common that industrial message format standards, such as ANSI or S.W.I.F.T., may be adopted. Format B, however, is used for message exchange between components of a system, and will most likely be in a simple format, such as simple structures to contain the message content, with additional control information for processing requirements.

Each message has only one version of the Internal Message Format in the system, although this Internal Message Format may be transformed into multiple versions of External Message Format. The message format unit has the capability to transform a message from its Internal Message Format to a requested External Message Format; and vice versa.

When a message is being transformed from an External Message Format to its Internal format, the unit will be able to detect any syntactical errors, and raise these errors for exception processing if syntax checking is required during its transformation. Different message format units will be required when different message formats are used, even though the functionality of the unit is the same. However, the calling interface of the message format unit can be standardized so that the processing of the caller will remain the same, regardless of which message format unit it uses.

The main API Message Format Units Payment Switch receives the information. The source information sender type is set to RTGS application server. All four inputs are passed to the routing unit, the routing unit would work out the destination to be, for example, Paying Bank B.

Figure 8:
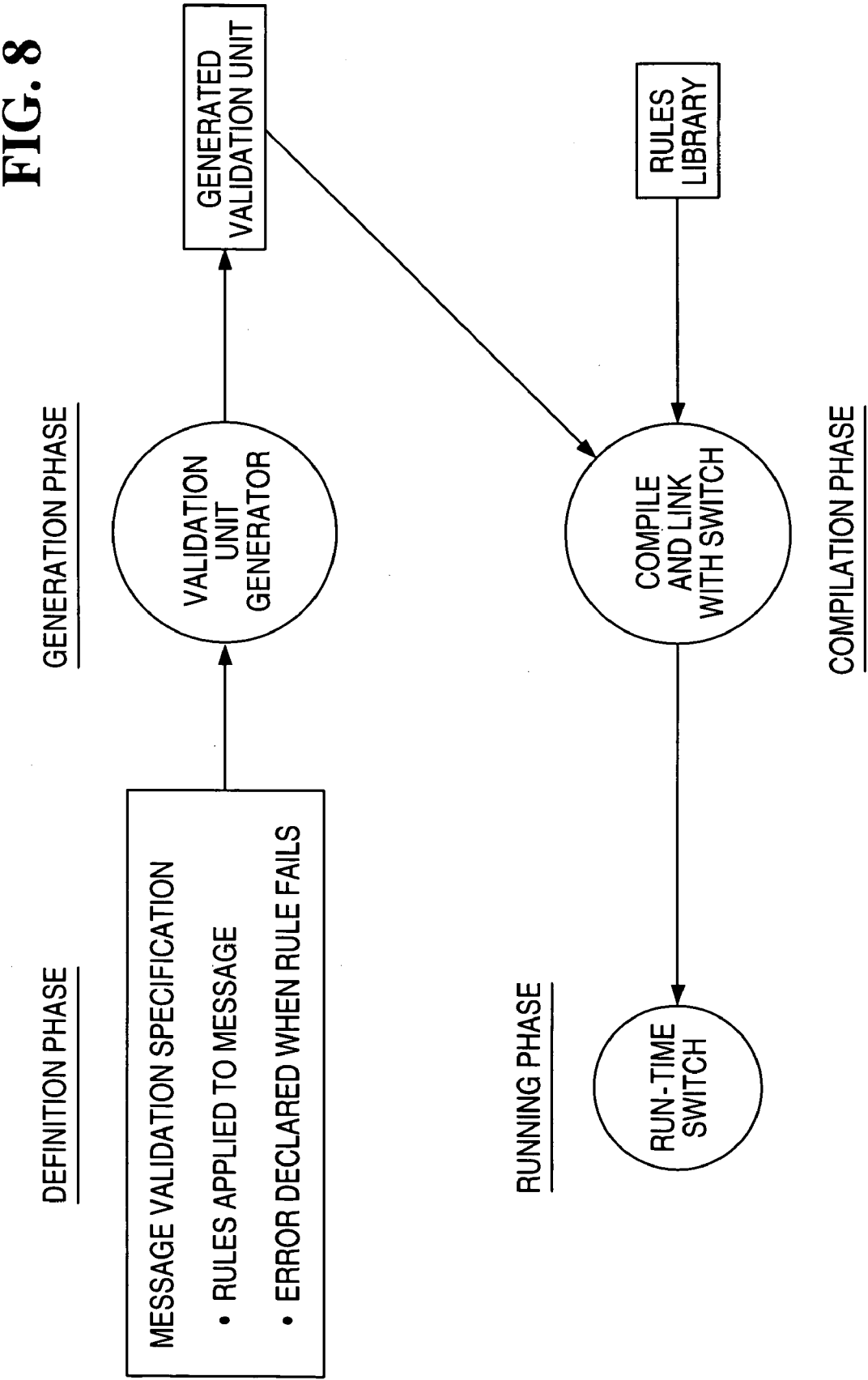
FIG. 8 illustrates several validation rules utilized by the invention.

FIG. 8 depicts the flow of the message with emphasis on how routing is accomplished. In this design, the logical routing table can cater to general channel and specific channel. A general channel is defined as a channel that serves all messages irrespective of the routing code such as bank number. For instance, if all MT110 payment transactions are served by a single RTGS server, then each Payment Switch would have a general channel pointing to the RTGS server, irrespective of what the paying bank number is contained in the message.

On the other hand, for the RTGS Server, the three pieces of information, excluding the Additional Routing Code which is the Paying Bank Number, would indicate the type of channels that would be used. With the checking of the Additional Routing Code, a specific channel could be determined to send the message. A logical map is used for the search of the specific channel. This logical map uses the channel type and the additional routing code to find the specific channel. For instance, the channel type used by RTGS Server in the above example is SWITCH, but the additional routing code 001-200-001 is known by the routing unit as a paying bank number, and a match would find that channel B to Payment Switch B can be used. Additional routing code is a code that helps the routing unit determine which specific channel to use, therefore the specification and comparison of the routing code has to be flexible.

It is proposed that the routing code can be checked in the following ways:

Equality—if the additional routing code equal to a specific value, then this specific channel is used.

Range—if the additional routing code falls into a range, then this specific channel is used.

Sequence—if the additional routing code is greater than or less than certain values, then this specific channel is used.

When a message arrives from an external source, it will be first transformed from its External Format into its Internal Format. After this transformation, the message, now in its Internal Format, will be ready for processing. The first phase of processing a message is usually to ensure the data correctness and integrity of the message before allowing it carry on with further processing; and this is where the validation unit will be invoked.

Incorporation by Reference

Much of the processing undertaken in the Message Processing Layer 10 is described in the U.S. patent application filed concurrently herewith, entitled "Method of Generating a Message Translation Program and Apparatus Therefor," in which the inventors are Alice Yip and Isana Lei. This Application has been assigned Ser. No. 09/550,191 and a filing date of Apr. 17, 2000.

Flow Charts

The operation of the modules shown in FIG. 1 will be described. The description will be framed in the context of 100 checks arriving at a switch, of the type shown in FIG. 1, and operated by the check-clearing system.

While the modules accomplish numerous highly technical functions, perhaps a basic group of functions includes the following:

1. Receive a message, or file, containing data which describes the 100 checks, but not the checks themselves.
2. Convert the data-format of the message into the format utilized by the invention, if different.
3. Analyze the checks:
   a) Determine whether the drawee-bank of each is valid.
   b) Tally the total of all checks.
   c) Determine whether the total matches that separately stated in the message.
4. Verify validity of the message, using a digital signature.
5. When errors are found, notify the relevant banks.
6. Coordinate the various modules which perform the steps identified above.

Coordination is required at least for the reason that the modules must read data about the checks from a common database.

These functions, and others, will be explained in greater detail.

Figure 9:
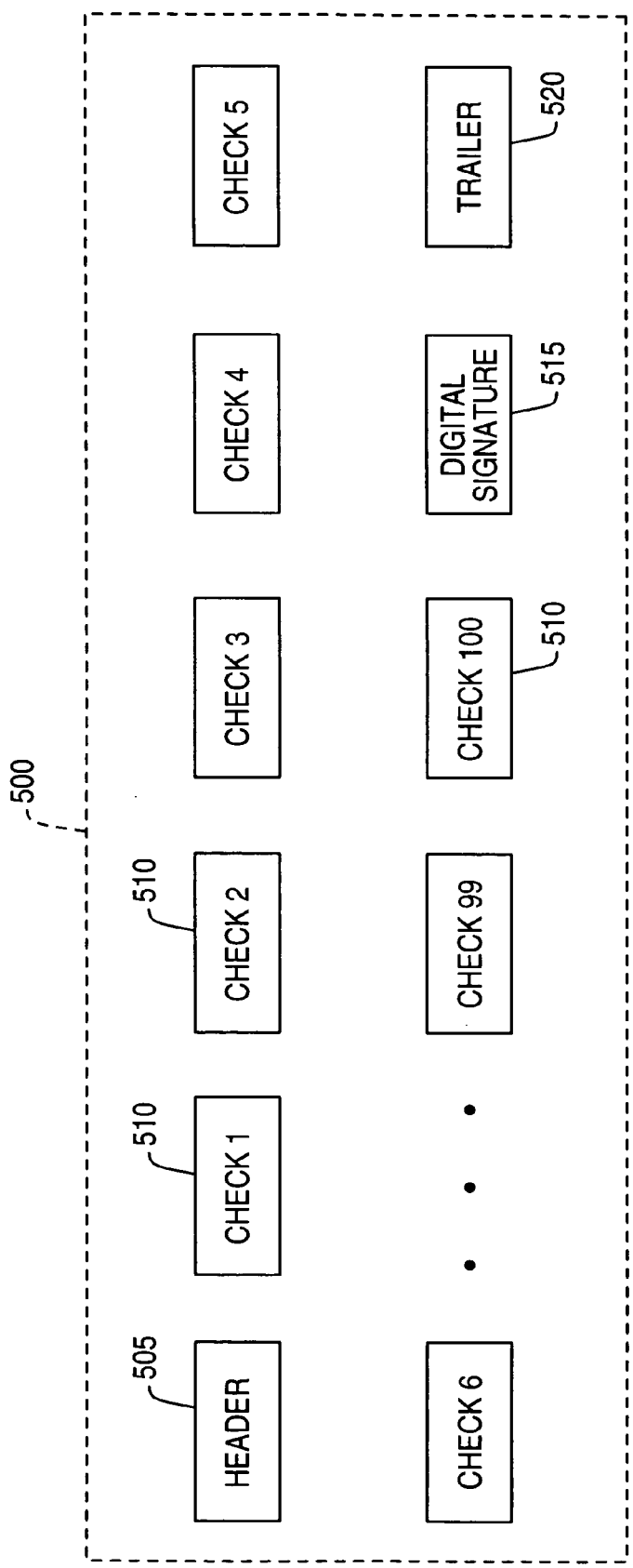
FIG. 9 illustrates a message which a switch receives.

FIG. 9 illustrates an exemplary message 500. Assume that this message is received by a check-clearing organization, and contains data concerning 100 checks to be processed.

The message 500 begins with a header 505, which is termed a "record," which is followed by 100 records 510, one for each check. Following the check-records 510 is a digital signature record 515, and then a trailer-record 520.

Figure 10:
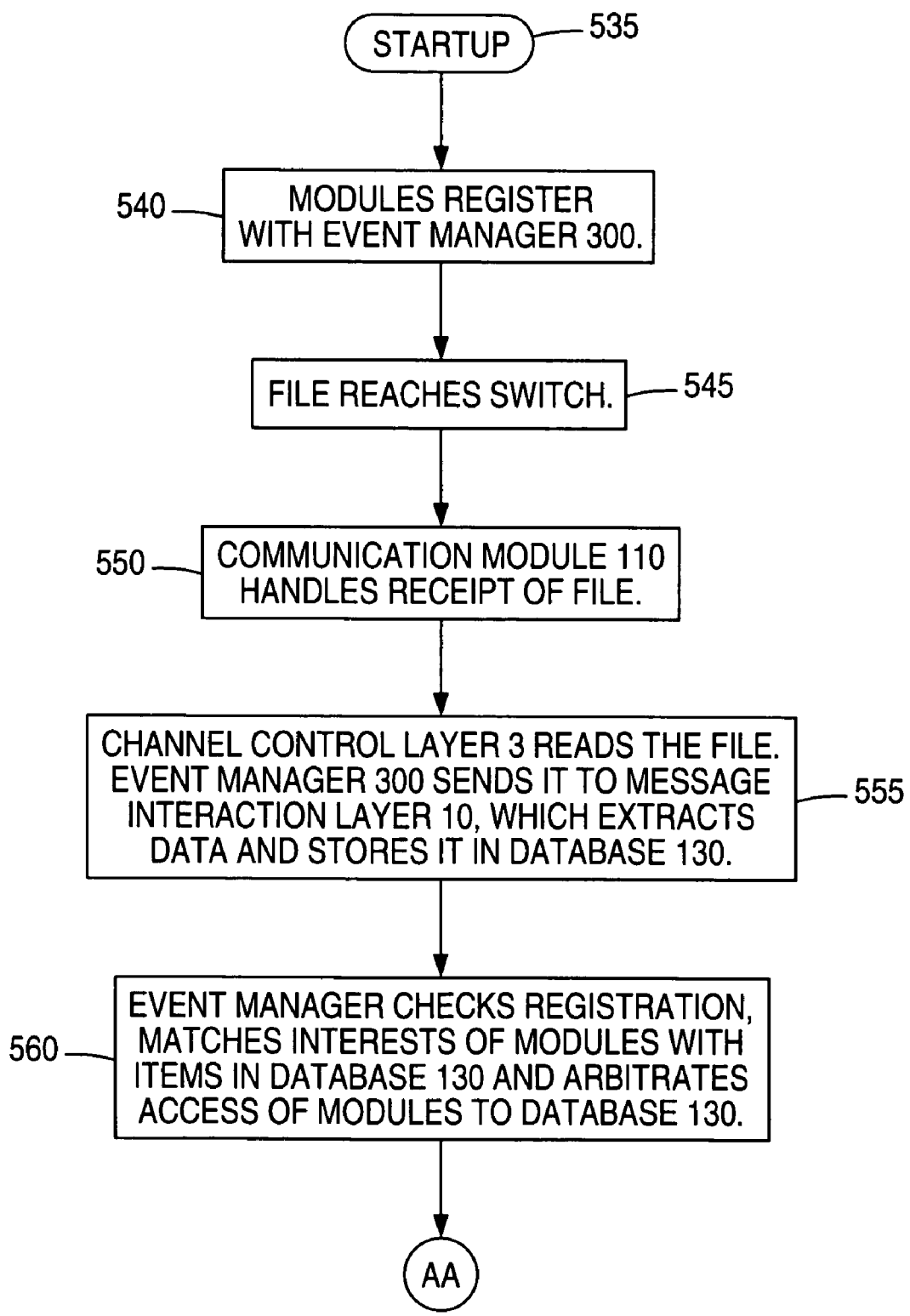
FIGS. 10–12 contain flow charts which illustrate logic implemented by one form of the invention.
Figure 11:
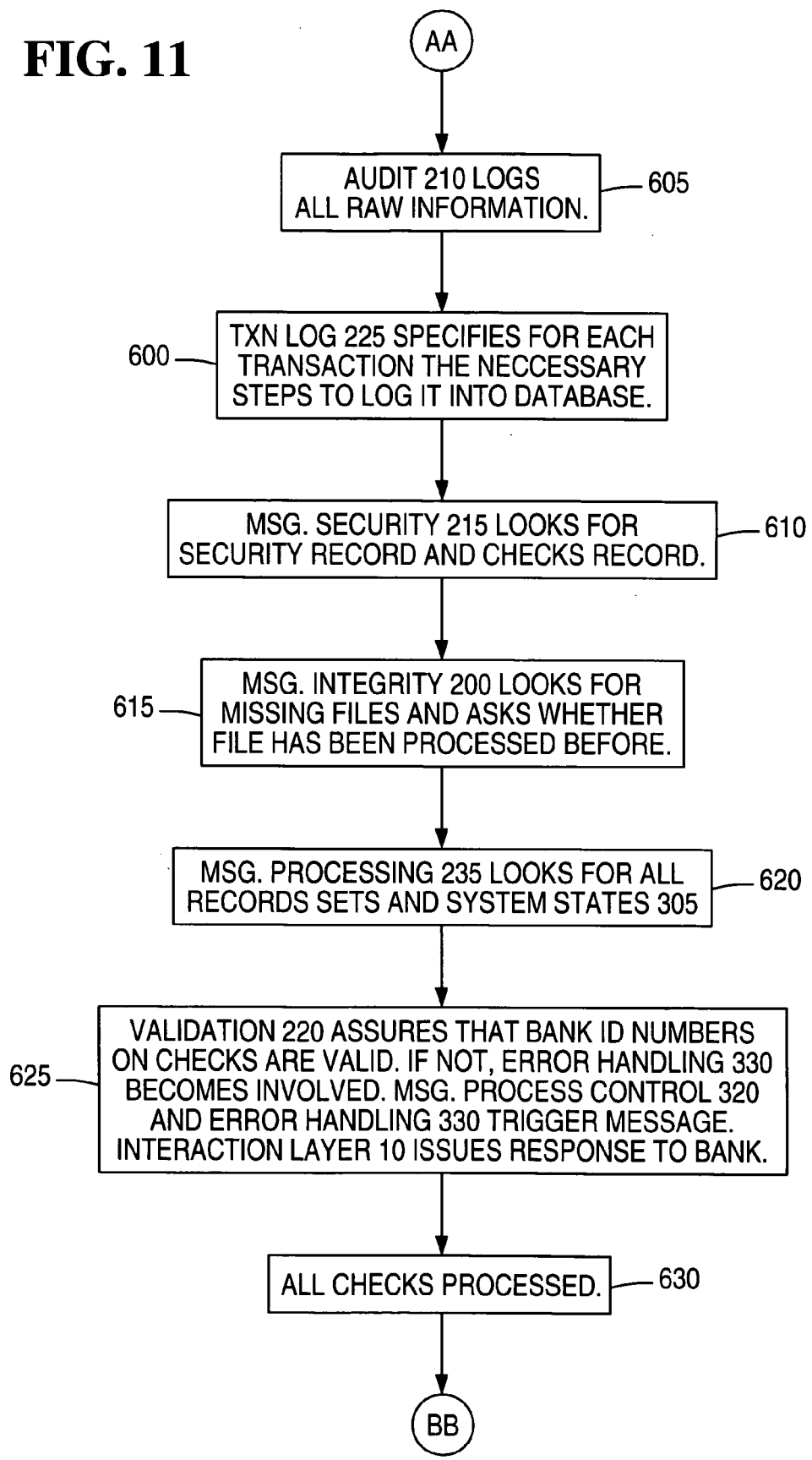
Figure 12:
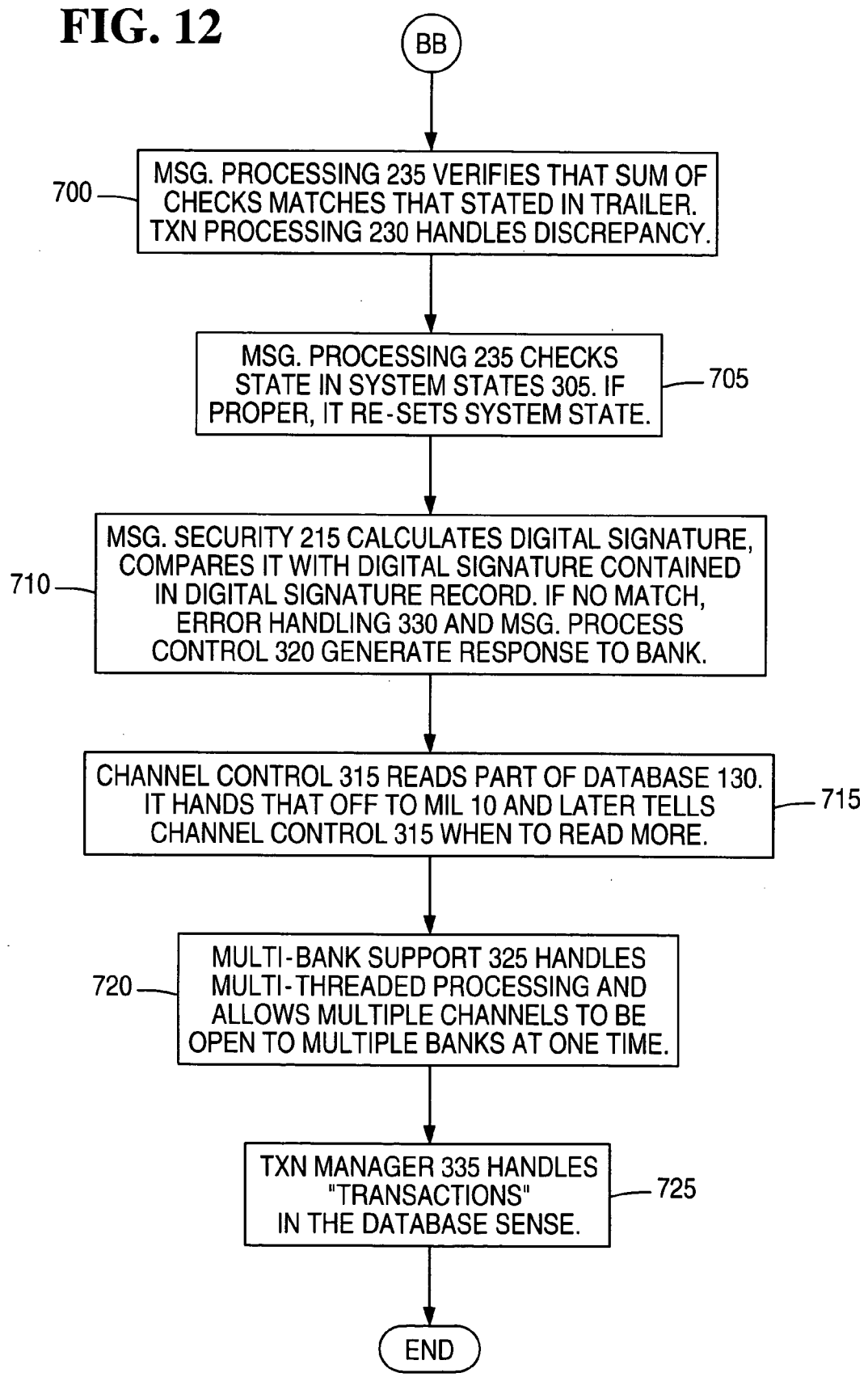

FIGS. 10–12 contain a flow chart illustrating processing steps which the invention undertakes.

Block 535 indicates that the system starts. In the start-up process, various initialization routines are undertaken, which are known in the art.

In block 540, modules which read records from the message 500 in FIG. 9 register with the event manager 300 in FIG. 1. In this registration process, the modules inform the event manager 300 as to which records they are interested in reading. This registration, and its effects, will be discussed further in block 560. But one basic idea behind the registration is this: module A, for example, registers interest in record Z. Then, the event manager 300 examines the records, and, when record Z is found, it informs module A of the availability of record Z.

After proper startup, the system is prepared to accept the message 500 in FIG. 9. Block 545 indicates that the message, or file, reaches the system, or switch. Block 550 indicates that the communication module 110 in FIG. 1 handles the details of the communication. These details are known in the art, and common types of communication programs, such as the well-known Kermit program, illustrate many of the types of details and issues which the communication module 110 handles.

As indicated by block 555, the communication module 110 in the channel control layer 3 sends the file to the message interaction layer 10. The latter extracts the data from the file, and stores it in database 130 in FIG. 1. The operation of the message interaction layer 10 is described in the patent application identified above, which is incorporated by reference herein. Now the records of the message 500 become available as a database, and the Event Manager 300 in FIG. 1 takes several steps.

As indicated in block 560 in FIG. 10, it matches (1) the interests of the modules, as expressed in their registration in block 540, with (2) the records of interest. Following that, the event manager 300 arbitrates the access of the modules to the records, because, in general, all modules cannot be granted access to all records at once. That is, the event manager 300 allows one module to obtain access, then another, and so on. Then, the event manager 300 allows the modules to perform their respective computations. Several examples of modules, and their computations, will be given.

In block 600 in FIG. 11, the audit module 210 in FIG. 1 logs most, or all, raw data within the message 500 (that is, it stores the entire contents of the message 500) for later auditing purposes.

In block 605, the transaction log 225 in FIG. 1 specifies for each transaction the necessary steps to log the transaction into the database 130.

In block 610, message security block 215 in FIG. 1 locates security records.

In block 615, the message integrity module 200 searches for missing files, and asks whether the file has been processed before.

In block 620, the message processing module 235 in FIG. 1 locates all the records, and obtains the necessary data from them. It also sets the system state, using the state-machine block 305 in FIG. 1.

State machines are known in the art, and are described, for example, in *Fundamentals of Logic Design* by Charles H. Roth (1985, West Publishing Company, St. Paul, Minn., ISBN 0-314-85292-1). In a state machine, a specific action triggers a change of state. But the particular change which occurs depends on the current state of the system. That state, of course, is a result of the previous history of the system.

A primary use of the state machine residing in block 305 in FIG. 1 is to assure that the header 505 and the trailer 520 in FIG. 1 are always processed in pairs. That is, block 620 in FIG. 11 sets the state machine, indicating that a header has been found. The trailer will not be later processed, unless the state machine indicates that the header has been previously processed.

Block 625 in FIG. 11 indicates that validation module 220 in FIG. 1 assures that the numbers on the checks which identify the banks are correct. For example, if a number is found which refers to a bank which has closed, an error condition arises. Error handler 330 in FIG. 1 handles the errors, together with the message processing control module 320. When an error occurs, these two modules cooperate with the message interaction layer 10 to notify the bank which presented the check in question.

The steps of FIG. 11 are repeated for all the checks within the message, or file, 500 in FIG. 9. When all checks have been processed, block 630 is reached.

In FIG. 12, block 700 indicates that the message processing module 235 in FIG. 1 (1) computes a total for the amounts of all the checks in the message 500, (2) reads the total stated in the trailer 520 in FIG. 9, and (3) compares the two totals. If the two totals do not match, the transaction processing module 230 handles the discrepancy.

In block 705, the message processing module 235 checks the system state in system states module 305 in FIG. 1. For example, in this particular situation, the system state should, at this time, indicate that both the header 505 and the trailer 520 have been read. If that is the case, the system state is re-set to an initial state, as indicated in block 705.

In block 710, the message security module 215 calculates the digital signature of the message 500. Digital signatures are known in the art, and are described, for example, in the text *Applied Cryptography*, by Bruce Schneier (John Wiley & Sons, New York, 1996, ISBN 0 471 12845 7).

A simple example of a digital signature is the following. The message 500 was prepared by a computer program. That program is equipped with an equation. The switch performing the logic of FIGS. 10–12 is equipped with the same equation.

Various items within the message 500 are treated as input to the equation. For example, the first three digits of the bank ID number on each check can be used as the inputs. For 100 checks, 100 three-digit numbers are thus used. These numbers are treated as variables A1, A2, A3, . . . A100.

These variables are fed to the equation by the computer program which prepared message 500, and the output of the equation, a number, is stored within the digital signature block 515 in FIG. 9. The output is the "digital signature."

The system executing the logic of FIGS. 10–12 extracts the same three-digit numbers from the checks, and feeds those 100 variables to the same equation. If the equation produces the same output as stored in the digital signature block 515, it is assumed that the bank ID numbers are correct, and not corrupted.

The actual digital signature computation is more complex than this simple example illustrates, but the example illustrates the principles involved.

If the digital signatures do not match, then an error condition arises. The error handling module 330 and the message processing control module 320 issue a message to the bank responsible for the 100 checks.

In FIG. 12, blocks 715, 720, and 725 indicate functions which occur at various times within the system. Block 715 refers to the operation of channel control module 315. This module handles the reading of data from the database 130 in FIG. 1. FIG. 13 schematically illustrates the operation.

Assume that Process 1 and Process 2 need the data. As indicated on the left side of the Figure, the channel control module 315 would first give data packet 1 to Process 1, and data packets 2 and 3 to Process 2. Then, as indicated on the right side, Process 1 will request another packet, which is packet 3 in this case. The channel control module 315 provides this packet 3.

This approach eliminates the requirement of each Process to read the entire database 130, and extract its desired data from it.

Block 720 in FIG. 12 refers to multi-bank support module 325 in FIG. 1. That module supports multi-threaded processing, and allows multiple channels to be open to multiple banks at once. That is, message A from Bank A can be received and processed, and then, immediately thereafter, message B from Bank B can be received and processed, and, immediately after that, message C from Bank A can be received and processed. Even though the messages may not literally be received and processed at the same time, the processing events are so close in time as to be treated as simultaneous.

Block 725 in FIG. 12 indicates that the transaction manager 335 handles "transactions" in the database sense. That is, the check-clearing operations described herein can be viewed as "transactions" in the financial sense. However, in database science, "transaction" is a term-of-art, and refers, in general, to the modification of data within a database.

Since numerous different parties will have access to the database, some agency must coordinate their activities at the application level, to prevent them from causing conflicts. In the invention, the transaction manager 335 performs this function. Such managers are known in the art.

One Form of Invention

Six generalized functions, and their sub-functions, were listed above, in the section located below the heading "Flow Charts." For a given switch, at a given time, the modules which implement those functions will be known, and fixed. However, as explained in the Background of the Invention, if the switch is to handle, for example, a new message format, then new modules must be installed within the switch, to handle the new format.

Some examples of changes in modules are the following. If a new message format, or protocol, is to be used, some, or all, of the modules within the message interaction layer 10 in FIG. 1 will be changed.

If a new communication protocol is to be used, a new communication module 110 will be installed.

If the checks are to be analyzed in a different way, a new message processing module 235 will be installed.

Therefore, in the general case, a system as shown in FIG. 1 is generated. However, that system is assembled using individual modules, such as the message processing module 235, which are selected from a group which contains different message processing modules.

For example, and in the general case, considering only the message processing layer 20, the following modules are available in an inventory from which a given system is assembled:

four different types of audit module 210;
three different types of message security module 215;
two different types of message integrity module 200;
five different types of message processing module 235;
two different types of transaction processing module 230
two different types of transaction logging module 225; and
six different types of validation module 220.

To assemble the system, one audit module 210 is selected, one message security module 215 is selected, one message integrity module 200 is selected, one message processing module 235 is selected, one transaction processing module 230 is selected, one transaction logging module 225 is selected, and one validation module 220 is selected.

This approach applies to the modules in all layers 3, 10, 20, and 30 in FIG. 1.

In another approach, for some modules, such as the transaction logging module 225, only one type of module is available. Thus, for example, repeating the type of example given above, the following modules are available:

four different types of audit module 210;
three different types of message security module 215;
two different types of message integrity module 200;

five different types of message processing module 235;
one type of transaction processing module 230;
one type of transaction logging module 225; and
one type of validation module 220.

To assemble a system, the following modules are selected: one each of an audit module 210, a message security module 215, a message integrity module 200, and a message processing module 235. However, since only one type of transaction processing module 230, one type of transaction logging module 225, and one type of validation module 220 are available, that single type is selected for each.

Thus, in this latter approach, every system assembled will contain (1) some modules which are the same in all systems and (2) some modules which are different in the systems. As to the latter point, all systems will not contain different modules, because the number of possible combinations will become exhausted at some time. That is, if four different modules of type A are available, only four individual systems can have different A modules. A fifth system will necessarily duplicate one of the four, as to the A module.

In another embodiment, an inventory of software modules is maintained, which includes (1) a group of type A modules; and (2) a collection of type B modules. When constructing each software system, a practitioner (1) includes copies of the entire group of type A modules in a system; and (2) includes copies of selected type B modules in the system.

In addition, the practitioner generates at least one customized module, which is a copy of neither a type A nor a Type B module, and includes that within the system.

Numerous substitutions and modifications can be undertaken without departing from the true spirit and scope of the invention. What is desired to be secured by Letters Patent is the invention as defined in the following claims.

What is claimed is:

1. An expedited method of assembling software systems, comprising the following steps:
   a) fabricating a collection of software systems, each of which system contains
      i) a processing module (PROC_MOD) which processes content of messages;
      ii) a single packaging module (PAK_MOD) which packages said messages into packets for transport out of the system;
      iii) a communication module (COM_MOD) which accepts and delivers message packets; and
      iv) a system control module (CONTROL) which coordinates the processes of (i), (ii), and (iii);
   b) during the fabrication of paragraph (a),
      i) fabricating identical CONTROL modules in all of the software systems;
      ii) fabricating identical COM_MOD modules in all of the software systems; and
      iii) fabricating PAK_MOD modules in all of the software systems, such that:
         A) a copy of a software unit A is contained in every PAK_MOD module;
         B) some PAK_MOD modules contain a software unit B with no unit C; and
         C) some PAK_MOD modules contain a software unit C with no unit B; and
   c) installing the software systems into respective electronic payment switches.

2. Method according to claim 1, wherein step b) includes:
   iv) fabricating PROC_MOD modules in all of the software systems, such that each system contains a single PROC_MOD module, and:
      A) a copy of a software unit D is contained in every PROC_MOD module;
      B) some PROC_MOD modules contain a software unit E with no unit F; and
      C) some PROC_MOD modules contain a software unit F with no unit E.

3. Method according to claim 1, further comprising:
   d) repeating steps of paragraphs (a) and (b) to thereby modify one or more of the software systems previously fabricated.

4. Method according to claim 1, wherein the software unit A is combinable with a different processing module than said processing module PROC_MOD.

5. Method according to claim 1, wherein
   i) the software unit A has existence independent of said processing module PROC_MOD, and
   ii) the software unit A is selectively combinable with another processing module, different from processing module PROC_MOD.

6. Method according to claim 1, wherein software units A, B, and C are not required to package messages into packets for said transport.

7. Method according to claim 1, wherein the message processed by the PROC_MOD module comprises data representing bank checks which are processed in a paperless automated check exchange and settlement system.

8. Method according to claim 1, wherein the message processed by the PROC_MOD module comprises
   i) data representing bank checks; and
   ii) a digital signature which allows authentication of the message.

9. Method according to claim 8, wherein
   i) the data includes a number for each check which identifies a bank, and
   ii) one or more of the modules ascertains whether the numbers are correct.

10. Method according to claim 1, wherein the message processed by the PROC_MOD module contains
   (1) data which describes a group of bank checks,
   (2) data which indicates a group total for the amounts of the checks, and
   (3) a digital signature,
wherein one or more modules perform the following steps:
   c) determine whether the drawee-bank listed in each check is correct;
   d) tally the amounts of all checks into a tallied total;
   e) determine whether the tallied total matches the group total;
   f) verify validity of the message, using the digital signature; and
   g) if steps (c), (d), (e), or (f) indicate an error, notifying a bank associated with a check producing the error.

* * * * *